April 1, 1924.
J. F. KRUCHTEN
PISTON AND CONNECTING ROD COUPLING
Filed Oct. 7, 1922
1,488,989
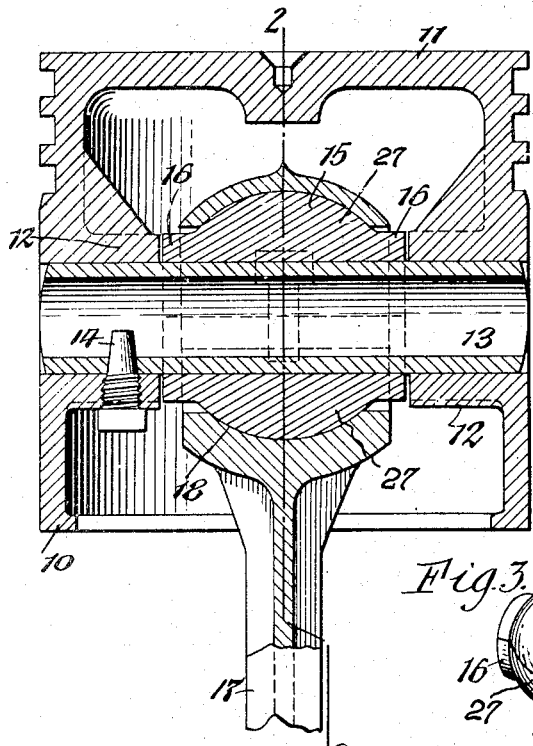
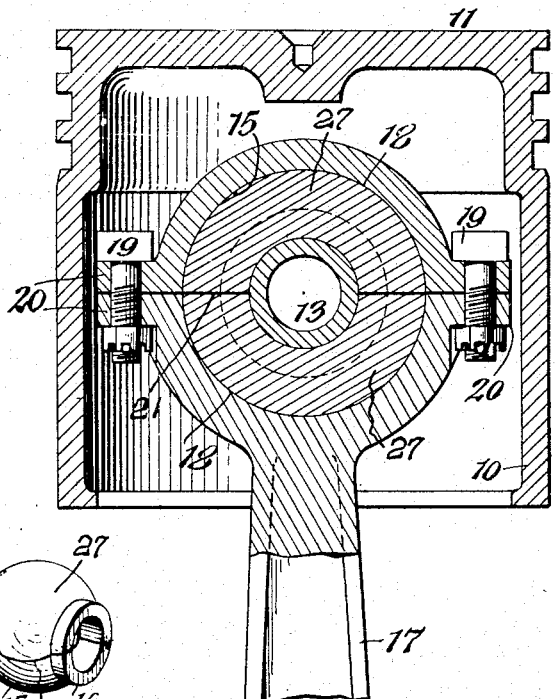
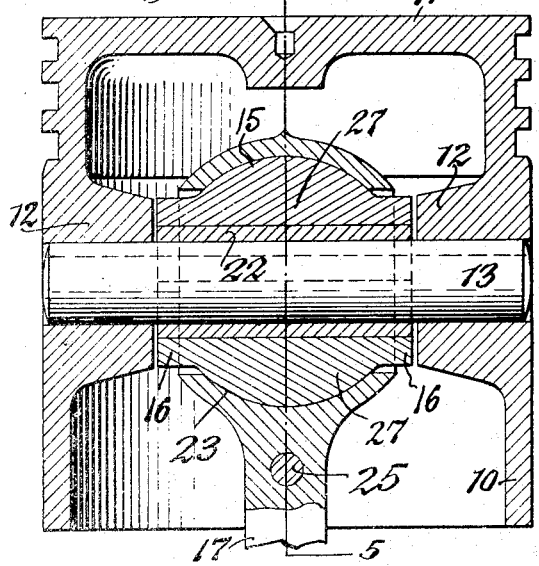
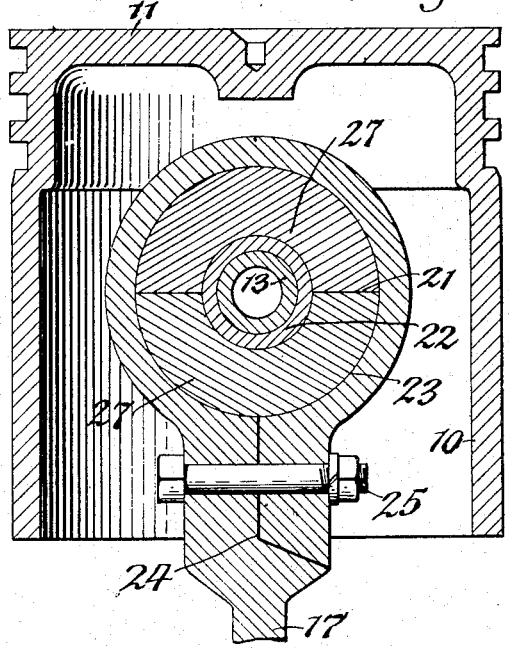
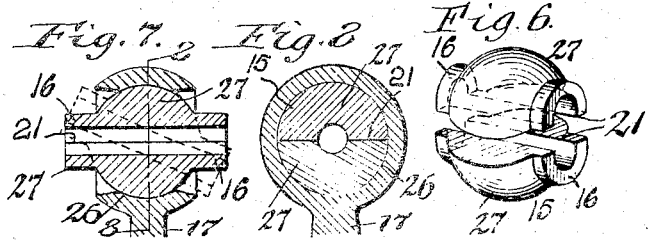
Inventor
John F. Kruchten
by Euper & Popp
Attorneys Patented Apr. 1, 1924.

1,488,989

UNITED STATES PATENT OFFICE.

JOHN F. KRUCHTEN, OF BUFFALO, NEW YORK.

PISTON AND CONNECTING-ROD COUPLING.

Application filed October 7, 1922. Serial No. 593,128.

*To all whom it may concern:*

Be it known that I, JOHN F. KRUCHTEN, a citizen of the United States, residing in Buffalo, in the county of Erie and State of New York, have invented new and useful Improvements in Piston and Connecting-Rod Couplings, of which the following is a specification.

This invention relates to a piston and connecting rod coupling whereby a piston and rod are capable of shifting their position relatively to each other in order to permit the piston to aline itself in the cylinder without producing a cramping action on the connection between the piston and the connecting rod.

It is the object of this invention to produce a coupling or joint having this capacity which is strong and durable, capable of being manufactured and assembled at low cost and which can be readily associated with the common forms of pistons now generally found on the market, so that no departure from the general practice is necessary in order to embody this invention in the well known types of gas engines.

In the accompanying drawings: Figure 1 is a longitudinal section of a piston and connecting rod which are connected by one form of my improvement. Figure 2 is a longitudinal section, taken on line 2—2, Fig. 1. Figure 3 is a perspective view of the bearing member which is interposed between the piston pin of the connecting rod in the construction shown in Figs. 1 and 2. Figure 4 is a longitudinal section showing another form of joint between the piston and connecting rod containing my invention. Figure 5 is a longitudinal section on the correspondingly numbered line in Fig. 4. Figure 6 is a perspective view of a form of bearing associated with the parts shown in Figs. 4 and 5. Figure 7 is a sectional view of a connecting rod having an integral spherical socket, and a two part bearing piece seated with its spherical surface in said socket, in accordance with my invention. Figure 8 is a longitudinal section taken on line 8—8, Fig. 7.

Similar characters of reference refer to like parts throughout the several views.

The piston in connection with which my invention is shown in the drawings is of the usual well known or standard type having a cylindrical body 10, which is open at its lower or rear end while its upper or front end is closed by means of a head 11, and the inner side of this body is provided on diametrically opposite sides with bearing lugs 12 provided with circular openings which are transversely in line with each other.

In the construction shown in Figs. 1 and 2, the piston pin 13, preferably of usual hollow form, is arranged transversely of the piston and seated at its opposite ends in the opening of the clamping lugs 12. As shown this piston pin may be held against movement in the piston by means of a locking pin 14 passing through one of the bearing lugs in the adjacent end of the piston pin or any other suitable means may be employed for this purpose, if desired.

Upon the central part of the piston pin and between the opposing inner ends of the bearing lugs 12 is arranged a bearing member which has a central spherical part 15 and a cylindrical end portion 16, the axis of the spherical part 15 intersecting the axis of the piston pin, and the bore of the opening in this bearing member, which receives the piston pin being concentric with the cylindrical end portion 16 of the bearing member and the piston pin. The member 15 is divided diametrically into two like sections 27 so as to form a longitudinal diametrical joint 21 between the same.

17 represents a connecting rod or pitman, which is provided at its upper or front end with a spherical socket or seat 18 which receives the spherical central part of the bearing member. In order to permit of making the bearing member in one piece and still enable the socket of the connecting rod to be applied thereto, this socket is split on its diametrically opposite sides and the sections of this socket on opposite sides of the split between the same may be connected by means of bolts 19 passing through corresponding lugs 20 on these sections, as shown in Fig. 2, or by any other suitable means.

The piston, piston pin and connecting rod are preferably constructed of ferrous metal while the bearing member is preferably constructed of bronze or similar metal, thereby insuring long life to the joint between the piston and connecting rod and avoiding the necessity of frequent repairs.

By means of this construction a ball and socket joint is produced between the spherical portions of the bearing member and the connecting rod which permits the piston to aline itself with the axis of the cylinder in which the same reciprocates and to travel freely therein without any cramping action in the connection between the piston and connecting rod, as would be liable to occur if the axis of the cylinder is not perfectly at right angles to the axis of the crank shaft with which the connecting rod is associated. The wear on the peripheries of the piston and the bore of the cylinder is therefore reduced to a minimum and avoids any unbalanced lateral pressure of the piston against the cylinder which ordinarily would cause the cylinder to wear oval and produce a leaky joint between the same and the piston, as well as producing the objectionable action commonly known as "piston-slap".

In the alternative construction of my invention shown in Figs. 4, 5 and 6, the bearing member is divided diametrically and lengthwise into two like sections 27 so as to form a longitudinal diametrical joint 21 between the same. These two sections are preferably mounted on opposite sides of the bushing 22 which is arranged upon the piston pin between the bearing lugs of the piston so that together these two sections of the bearing member form a spherical central bearing surface and two cylindrical portions or necks on opposite sides of the spherical portion, in substantially the same form as that shown and described with reference to Figs. 1, 2 and 3.

In the construction shown in Figs. 4 and 5, the connecting rod 17 has its spherical socket 23 which receives the spherical surfaces of the bearing member provided only with a single split 24 adjacent to the body of the connecting rod, the ends of this socket on opposite sides of this split being connected by means of a bolt 25.

In order to introduce the two sections of the split bearing member into the socket 23 the split parts of the latter are spread sufficiently for this purpose and after such introduction of the bearing member, the bolt 25 is tightened for the purpose of closely engaging the spherical surfaces of the bearing member and the socket to avoid undue wear and rattling.

If desired, the socket 26 of the connecting rod 17 may be made integral and without a split in any part thereof, as shown in Figs. 7 and 8 in which case the socket and sections of the bearing member must be made of such shape that these bearing members may be introduced into the socket 26 through the openings at opposite ends thereof by introducing one of these sections at an angle into the socket through one of the end openings of the same and introducing the other section of the bearing member at an angle through the opening in the opposite end of the socket, which position of these bearing sections is indicated by dotted lines in Fig. 7. After such introduction of these bearing sections into the socket, the same may be turned into their normal position indicated by full lines in Fig. 7 ready to be assembled by the piston pin with the piston, similar to the constructions previously described.

I claim as my invention:

A piston, a piston pin mounted transversely on said piston, a bearing member mounted on said pin and having a spherical portion, and a connecting rod having a spherical socket which receives said spherical portion, said bearing member being divided lengthwise and diametrically into like sections.

JOHN F. KRUCHTEN.